United States Patent [19]

Mutchler

[11] 3,822,991
[45] July 9, 1974

[54] GAS-FIRED FURNACE

[75] Inventor: Paul A. Mutchler, University City, Mo.

[73] Assignee: American Air Filter Company, Inc., Louisville, Ky.

[22] Filed: Oct. 9, 1973

[21] Appl. No.: 404,396

[52] U.S. Cl. ............................ 432/223, 126/110 B
[51] Int. Cl. ............................................. F24h 3/06
[58] Field of Search ...... 432/223; 126/110 D, 110 B

[56] References Cited
UNITED STATES PATENTS

| | | | |
|---|---|---|---|
| 2,645,278 | 7/1953 | Holthouse, Sr. et al. | 126/110 B |
| 2,678,811 | 5/1954 | Mueller | 432/223 |
| 3,010,449 | 11/1961 | Owen | 126/110 B |
| 3,543,742 | 12/1970 | Stump et al. | 126/110 B |

FOREIGN PATENTS OR APPLICATIONS

| 551,759 | 11/1956 | Italy | 432/223 |
|---|---|---|---|

Primary Examiner—John J. Camby

[57] ABSTRACT

A fuel-fired furnace including a heat exchanger mounted in a housing in heat transfer relation with flowing air passing over the heat transfer surface of the heat exchanger, and, a fuel burner assembly; the heat exchanger having a centrally disposed combustion chamber communicating with a flue gas return means at one end and a fuel burner assembly at the opposite end; the combustion chamber having an outlet disposed in the side thereof whereby the flow of products of combustion leaving the chamber is in a radially outward direction; and, the combustion chamber includes a baffle therein spaced from and covering the outlet, the baffle having an opening therein whereby the flow of flue gas leaving the combustion chamber passes through the opening in the baffle.

4 Claims, 3 Drawing Figures

PATENTED JUL 9 1974      3,822,991

GAS-FIRED FURNACE

BACKGROUND OF THE INVENTION

The invention relates to a fuel-fired furnace and more particularly, to a novel heat exchanger and fuel burner assembly, the heat exchanger having a novel baffle arrangement therein for improving the efficiency of combustion.

In previous forced draft burner constructions for fuel-fired furnaces having cylindrical shaped return flue gas passage-ways or horizontal return tubes, high velocity nozzles from small diameter blast tubes have been used to fire into rectangular refractory combustion chambers or cylindrical furnace tubes in an attempt to secure an efficient combustion process. In accordance with the present invention, it is recognized that the combustion chambers and cylindrical furnace tubes which allow for the passage of combustion products out of the combustion chambers in a one pass type of arrangement are inefficient. Furthermore, it is recognized that in order to improve the efficiency of some of these combustion chambers, complex and expensive baffle arrangements have been installed in order to recycle the combustion products back into the combustion chamber or to increase the turbulence in the combustion chamber in hopes of improving the efficiency of the heat exchanger.

SUMMARY OF THE INVENTION

The present invention, recognizing the disadvantages of previous fuel-fired furnaces, provides a novel baffle arrangement within a combustion chamber which is economical, easy to fabricate and yet improves the efficiency of combustion within the chamber by increasing the circulation of the products of combustion within the combustion chamber.

The present invention advantageously provides a straight-forward arrangement for the preparation of a fuel-fired furnace.

The present invention further provides a novel heat exchanger for use in fuel-fired furnaces including baffle means therein spaced from and aligned with the flue gas combustion outlet to increase the circulation of the products of combustion within the combustion chamber and increase the heat output of all primary heating surfaces.

Various other features of the present invention will become obvious to those skilled in the art upon reading the disclosure set forth hereinafter.

More particularly, the present invention provides a fuel-fired furnace comprising: a furnace housing having an air inlet and an air outlet, the furnace housing including a heat exchanger and a fuel-fired burner assembly; the burner assembly having an outlet opening therein in communication with the heat exchanger; the heat exchanger including a combustion chamber of a relatively large cross-sectional area with an inlet in axial alignment with the outlet opening of the burner assembly at one end and an outlet at the other end in communication with at least one flue-gas return duct; the return duct being in communication with a flue-gas collector to receive products of combustion from the combustion chamber transferring the products of combustion to the flue-gas collector; the outlet of the combustion chamber being disposed in a side of the combustion chamber whereby the gases leaving the combustion chamber flow in a radially outward direction; the combustion chamber having a baffle means therein spaced from and covering the outlet to provide an opening therein whereby the gases leaving the combustion chamber pass through the opening in the baffle.

It is to be understood that the description of the examples of the present invention given hereinafter are not by way of limitation. Various modifications within the scope of the present invention will occur to those skilled in the art upon reading the disclosure set forth hereinafter.

Referring to the drawing.

Figure 1:
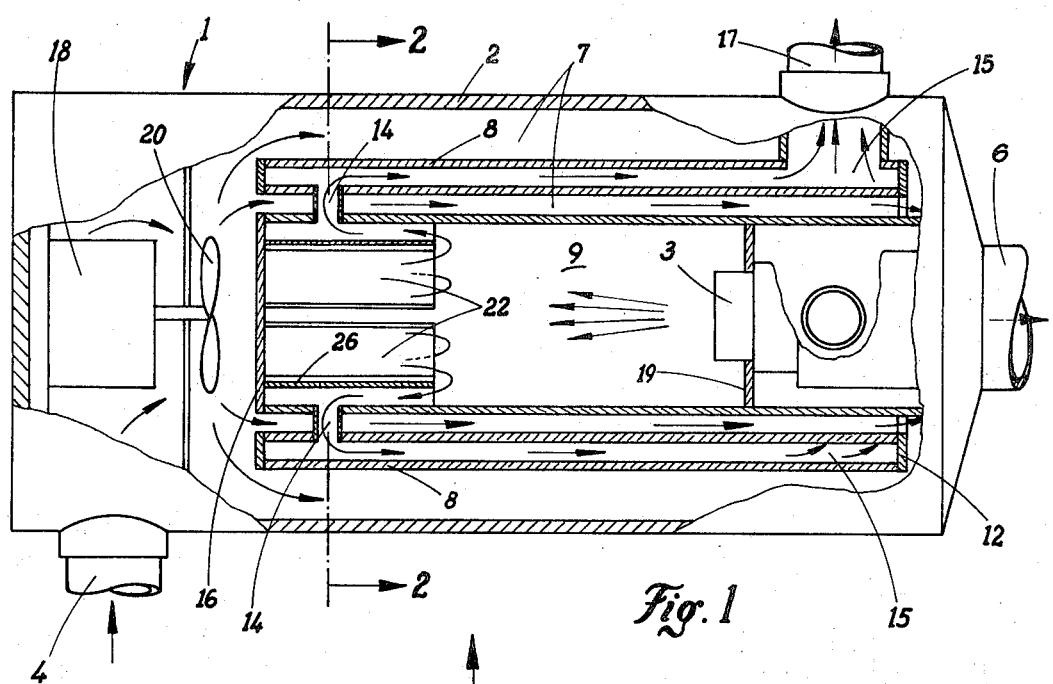
FIG. 1 is an elevational view, partly in cross-section, of a fuel-fired furnace of the present invention.

FIG. 1 illustrates a fuel-fired furnace 1 of the present invention including a fuel burner 3 and a heat exchanger 7. The fuel-fired furnace 1 further includes an outer housing 2 having an inlet 4 for air which is to be heated in the furnace 1 and an outlet 6 for the discharge of the heated air. Means for drawing air into the furnace 1 is a blower 20 having an appropriate motor 18 in communication therewith.

The heat exchanger 7 includes a cylindrical return flue gas chamber 8 of annular cross-section disposed about an enlarged cylinder or combustion chamber tube 9 of relatively large cross-sectional area, the flue gas chamber 8 being affixed at one end to a circular cross-over or cylindrical conduit 14 and at the other end to a rear tube sheet 12 of a flue gas collecting plenum 15 including combustion products discharge 17. The combustion chamber tube 9 is closed at the flue gas discharge end by a gas impervious plate member 16 and is open at the combustion end to receive the burner assembly 3 therein, burner assembly 3 being mounted within the opening in plate member 19. It is realized that the return flue gas chamber 8 may also be a plurality of elongated tubes of relatively small cross-sectional area.

Figure 2:
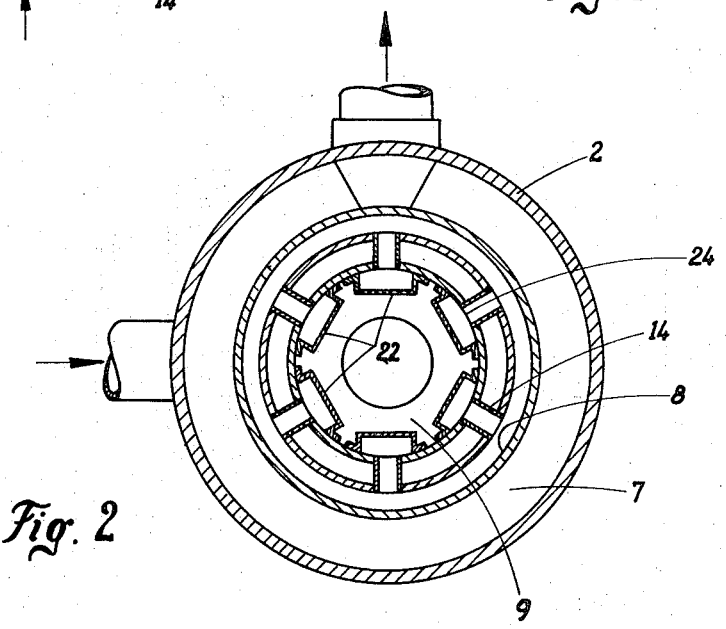
FIG. 2 is a cutaway taken along line 2—2 of FIG. 1.
Figure 3:
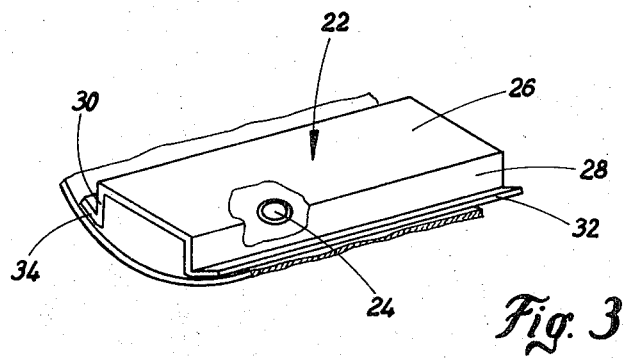
FIG. 3 is an enlarged perspective view, partially cutaway, of one preferred baffle arrangement of the present invention.

In FIGS. 2 and 3, an elongated baffle 22 is exemplified, baffle 22 being spaced from and covering the outlet 24 of the combustion chamber tube 9. Baffle 22 (FIG. 3) is of generally channel-shaped configuration with a top-section 26 and two side sections 28 and 30. Baffle 22 further includes outwardly extending lip portions 32 and 34, the lip portions 32 and 34 being facingly engaged against and fastened to the curved wall of the combustion chamber tube 9. The elongated baffle 22 abuts at its longitudinal edge the plate member 16 of the combustion chamber tube 9 and extends longitudinally down the tube a preselected distance past the outlet 24 so that as the combustion gases move toward the back plate 16, the combustion gases are forced to change direction before leaving combustion chamber tube 9 thereby increasing the circulation of the products of combustion within the combustion chamber tube 9. The extended circulation of the combustion gases within the combustion chamber tube 9 increases the efficiency of the combustion in combustion chamber 9 as burning gases are not allowed to escape through the circular cross-over 14 into the secondary heating surface until the combustion process is substantially complete.

In the operation of the furnace 1, a fluid being heated by the furnace 1 enters the furnace 1 through inlet 4, being drawn therethrough by blower 20, the fluid circulating through the housing 2 in heat-transfer relationship with the heat exchanger 7. The heated air then leaves the furnace through the housing air outlet 6.

It is realized that various changes may be made to the specific embodiment shown and described without departing from the scope and spirit of the present invention.

What is claimed is:

1. A gas-fired furnace comprising: a furnace housing having an air inlet and an air outlet, said furnace housing including a heat exchanger and a fuel-fired burner assembly; said burner assembly having an outlet opening therein in communication with said heat exchanger; said heat exchanger including a combustion chamber of relatively large cross-sectional area with an inlet in axial alignment with said outlet opening of said burner assembly at one end and an outlet at the other end in communication with at least one flue-gas return duct; said return duct being in communication with a flue-gas collector to receive products of combustion from said combustion chamber transferring the products of combustion to said flue-gas collector; said outlet of said combustion chamber being disposed in a side of said combustion chamber whereby the gases leaving said combustion chamber flow in a radially outward direction; said combustion chamber having a baffle means therein spaced from and covering said outlet to provide an opening therein whereby the gases leaving the combustion chamber pass through said opening in the baffle.

2. The fuel-fired furnace of claim 1 wherein said baffle is of generally channel-shaped cross-section abutting the back plate of the combustion chamber and extending over and past said combustion chamber outlet for a preselected distance.

3. The fuel-fired furnace of claim 1 wherein said combustion chamber is a combustion chamber tube.

4. The fuel-furnace of claim 1 wherein said return duct is of annular cross-section co-axially with and spaced from said combustion chamber.

* * * * *